(12) United States Patent
Park et al.

(10) Patent No.: US 11,056,787 B2
(45) Date of Patent: Jul. 6, 2021

(54) HYBRID ANTENNA

(71) Applicants: SAMSUNG ELECTRONICS CO., LTD., Suwon-si (KR); HONGIK UNIVERSITY INDUSTRY-ACADEMIA COOPERATION FOUNDATION, Seoul (KR)

(72) Inventors: Jae-Hyun Park, Suwon-si (KR); Jeong-Hae Lee, Seoul (KR); Young-Ho Ryu, Yongin-si (KR); Chang-Hyun Lee, Incheon (KR); Min-Seo Park, Changwon-si (KR); Sung-Bum Park, Suwon-si (KR); Kwi-Seob Um, Seoul (KR); Chong-Min Lee, Seoul (KR)

(73) Assignees: SAMSUNG ELECTRONICS CO., LTD., Suwon-si (KR); HONGIK UNIVERSITY INDUSTRY-ACADEMIA COOPERATION FOUNDATION, Seoul (KR)

(*) Notice: Subject to any disclaimer, the term of this patent is extended or adjusted under 35 U.S.C. 154(b) by 0 days.

(21) Appl. No.: 16/348,635

(22) PCT Filed: Feb. 10, 2017

(86) PCT No.: PCT/KR2017/001490
§ 371 (c)(1),
(2) Date: May 9, 2019

(87) PCT Pub. No.: WO2018/088634
PCT Pub. Date: May 17, 2018

(65) Prior Publication Data
US 2019/0267712 A1 Aug. 29, 2019

(30) Foreign Application Priority Data

Nov. 14, 2016 (KR) .......................... 10-2016-0150938

(51) Int. Cl.
*H01Q 1/38* (2006.01)
*H01Q 5/335* (2015.01)
(Continued)

(52) U.S. Cl.
CPC ............... *H01Q 5/335* (2015.01); *H01Q 1/24* (2013.01); *H01Q 1/364* (2013.01); *H01Q 1/38* (2013.01); *H01Q 13/08* (2013.01); *H02J 50/20* (2016.02)

(58) Field of Classification Search
CPC .......... H02J 50/005; H02J 50/20; H02J 50/23; H02J 50/27; H01Q 5/335; H01Q 13/08;
(Continued)

(56) References Cited

U.S. PATENT DOCUMENTS

2005/0225492 A1 10/2005 Metz
2012/0086602 A1 4/2012 Park et al.
(Continued)

FOREIGN PATENT DOCUMENTS

KR 10-2011-0042001 4/2011
KR 10-2012-0036748 4/2012
(Continued)

OTHER PUBLICATIONS

Huchen Sun et. al, "A Dual-Band Rectenna Using Broadband Yagi Antenna Array for Ambient RF Power Harvesting", IEEE Antennas and Wireless Propagation Letters, vol. 12, 2013 (Year: 2013).*
(Continued)

*Primary Examiner* — Seokjin Kim
(74) *Attorney, Agent, or Firm* — Nixon & Vanderhye, P.C.

(57) ABSTRACT

A hybrid antenna used for an electronic device is disclosed. A hybrid antenna comprises: a substrate comprising a first surface and a second surface and having an insulator; a first conductive member disposed on the first surface of the
(Continued)

substrate and having a hole formed therein; a second conductive member disposed on a first area of the second surface of the substrate; and a third conductive member disposed on a second area of the second surface of the substrate and connected to a ground of an electronic device, wherein a first portion of the first conductive member operates as a first antenna for receiving a broadband signal and supplying power to the electronic device, and a second portion operates as a second antenna for receiving wireless power and supplying power to the electronic device, wherein a first power feeding unit is formed between the first antenna and second antenna.

14 Claims, 10 Drawing Sheets

(51) Int. Cl.
 *H02J 50/20* (2016.01)
 *H01Q 1/24* (2006.01)
 *H01Q 1/36* (2006.01)
 *H01Q 13/08* (2006.01)

(58) Field of Classification Search
 CPC .......... H01Q 1/234; H01Q 1/364; H01Q 1/38; H01Q 1/243; H01Q 1/248
 See application file for complete search history.

(56) References Cited

U.S. PATENT DOCUMENTS

| | | |
|---|---|---|
| 2013/0267170 A1 | 10/2013 | Chong et al. |
| 2015/0288067 A1 | 10/2015 | Kwon et al. |
| 2016/0094091 A1* | 3/2016 | Shin ............... H01Q 9/0414 307/104 |
| 2016/0190868 A1* | 6/2016 | Shao ............... H01Q 1/38 307/149 |

FOREIGN PATENT DOCUMENTS

| | | |
|---|---|---|
| KR | 10-2013-0113222 | 10/2013 |
| KR | 10-2015-0114871 | 10/2015 |
| KR | 10-1629105 | 6/2016 |

OTHER PUBLICATIONS

International Search Report for PCT/KR2017/001490 dated Aug. 8, 2017, 4 pages.
Written Opinion of the ISA for PCT/KR2017/001490 dated Aug. 8, 2017, 4 pages.

* cited by examiner

HYBRID ANTENNA

CROSS-REFERENCE TO RELATED APPLICATIONS

This application is a U.S. National Stage application under 35 U.S.C. § 371 of an International application filed on Feb. 10, 2017 and assigned application number PCT/KR2017/001490, which claimed the priority of a Korean patent application filed on Nov. 14, 2016 in the Korean Intellectual Property Office and assigned Serial number 10-2016-0150938, the entire disclosures of which are hereby incorporated by reference.

TECHNICAL FIELD

The disclosure relates to a hybrid antenna for receiving a wideband signal and wireless power, and more particularly, to a combination of a wideband antenna and an array antenna having a meta structure.

BACKGROUND ART

The Internet of Things (IoT), which means that intelligent objects are connected to the Internet such that communication is established between people and objects and between objects and objects which communicate with each other through a network without being dependent on humans, has been spreading rapidly in recent years.

In order to realize IoT technology, there is a demand for development of low-power communication devices that can be easily mounted on objects and for technology that provides smooth power supply to a plurality of communication devices mounted on various objects. As measures to efficiently supply power to IoT devices in this situation, RF wireless power transmission and RF energy harvesting technologies are attracting attention.

Wireless power transmission includes a magnetic induction method, a magnetic resonance method, and an electromagnetic wave method, of which the electromagnetic wave method is advantageous for remote power transmission of several meters compared with other methods. Since an electromagnetic wave wireless power transmission system is intended to transmit power wirelessly, it should be designed focusing on transmission distance, space loss, and power consumption of a reception part rather than factors such as linearity and noise. The main components of the system configuration to be considered at this time include frequency, transmission distance, and antenna gain.

The RF energy harvesting technology is a technology that receives RF energy in the air and uses the RF energy as electric power for electronic devices. The RF energy harvesting technology is advantageous in that it is possible to secure energy without supplying energy separately. The major performance factors of the energy harvesting antenna include a broadband characteristic for securing the energy of RF signals in various frequency bands and antenna efficiency for high energy yield.

SUMMARY

An embodiment of the disclosure provides a filter system, in which a wideband antenna and a meta-structure-based array antenna are coupled in order to miniaturize a product and which is optimized for coupling between a wideband antenna and an antenna operating in a different frequency band in order to prevent performance deterioration of the wideband antenna and the meta-structure antenna at the time of the coupling of the two antennas.

An antenna of an electronic device according to an embodiment of the disclosure includes a substrate made of an insulator, a first conductive member disposed on a first surface of the substrate and having a hole formed therein, and a second conductive member disposed on a first area of a second surface of the substrate. A first portion of the first conductive member may operate as a first antenna for receiving a broadband signal and supplying power to the electronic device, a second portion may operate as a second antenna for receiving wireless power and supplying power to the electronic device, and a first power feeding portion may be formed between the first antenna and second antenna.

A band-stop filter may be disposed between the first power feeding portion and the first antenna.

A band-pass filter may be disposed between the first power feeding portion and the second antenna.

The second portion may include a plurality of meta-structure antennas composed of Mu-Zero Resonance (MZR) elements.

Each of the meta-structure antennas may include an interdigital structure gap.

According to an aspect of the disclosure, the antenna may further include a third conductive member disposed in a second area of the second surface of the substrate, and one side of each of the MZR elements may be connected to the third conductive member through a via hole.

Each of the meta-structure antennas may be fed with power through a microstrip line.

The lengths of transmission lines from respective meta-structure antennas to the first power feeding portion are all the same.

Transmission lines may be disposed between the respective MZR elements that constitute the meta-structure antennas.

The second conductive member may be disposed at a position corresponding to the hole.

One side of the first portion of the first conductive member may have a tapered structure, that is, an inclined line structure.

The first portion of the first conductive member, the hole, the substrate, and the second conductive member may form a resonance circuit.

The hole may have a circular or polygonal shape.

The band-stop filter may have an open stub structure.

The capacitance of the band-pass filter may be determined by the interdigital gap.

The capacitance of the band-pass filter may be determined by a capacitor disposed in the band-stop filter.

According to the embodiments of the disclosure, since a wide-band antenna and a meta-structure antenna that operate at a single frequency for wireless power reception are coupled to each other and operate together, it is possible to receive a wideband signal and wireless power for securing energy from electromagnetic waves of a wide frequency band (a wide band) using a single port, and to miniaturize a product.

DETAILED DESCRIPTION OF EXAMPLE EMBODIMENTS

Figure 1A:
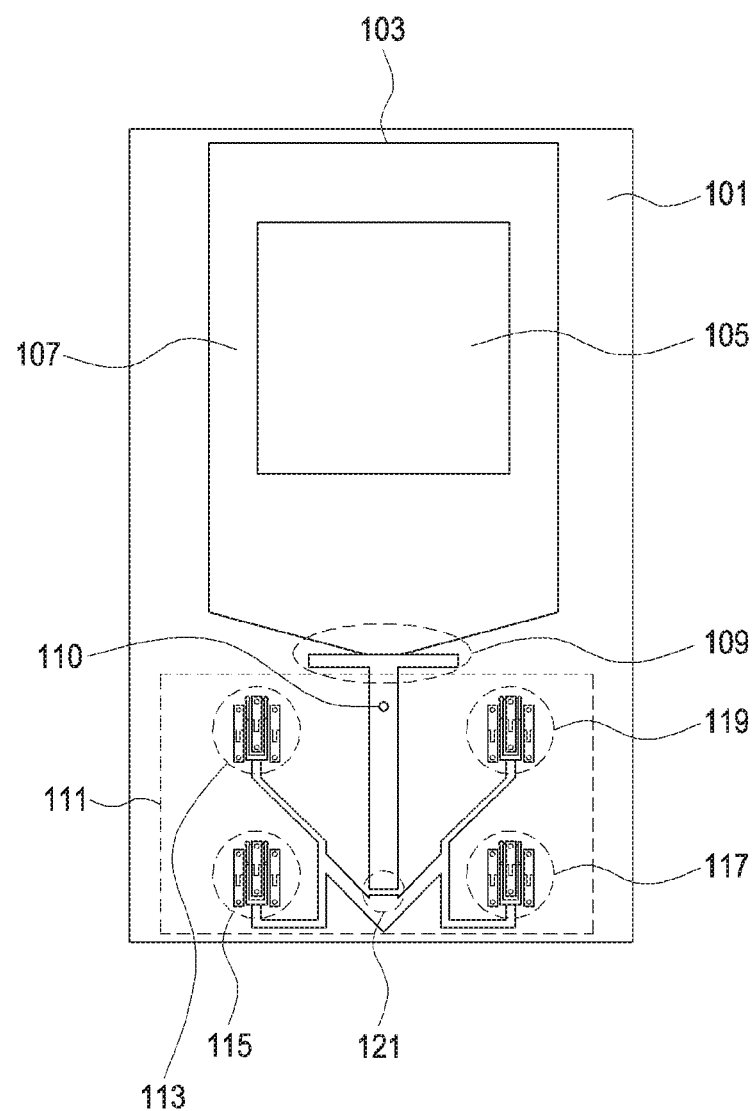
FIGS. 1A and 1B illustrate a hybrid antenna according to an embodiment of the disclosure.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A and/or B", or "one or more of A and/or B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it could be understood that when an element (e.g., a first element) is referred to as being "directly connected to" or "directly coupled to" another element (e.g., a second element), there is no intervening element (e.g., a third element) between the element and the other element.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device.

Figure 1B:
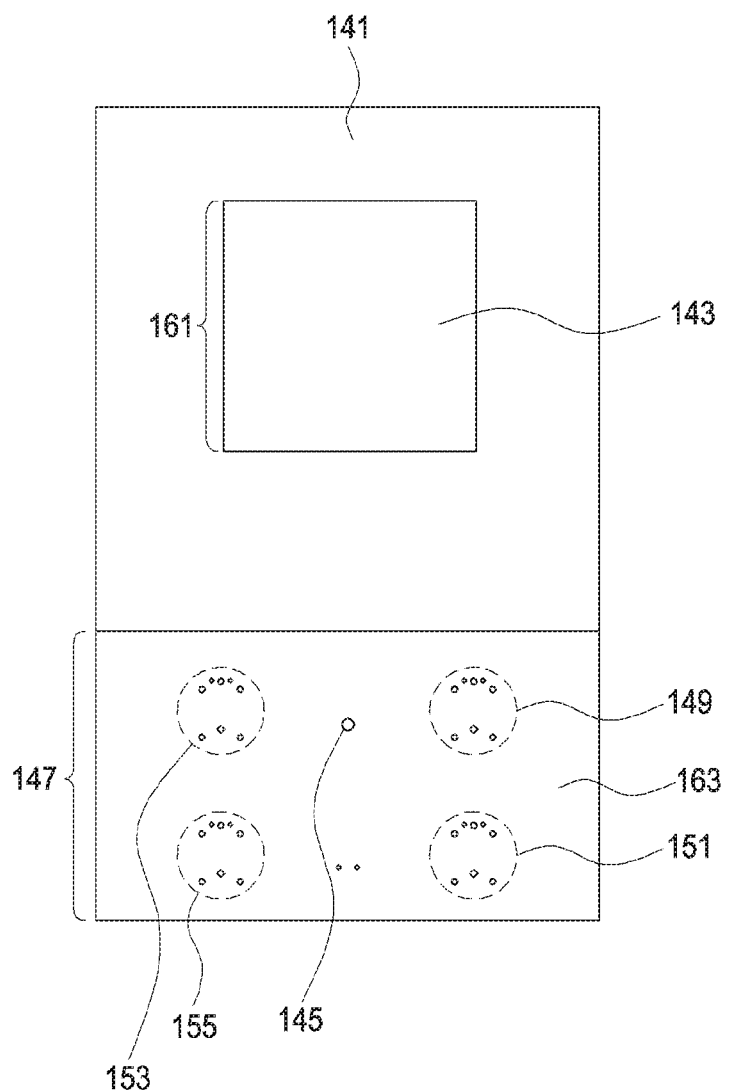

FIGS. 1A and 1B illustrate a hybrid antenna according to an embodiment of the disclosure.

Referring to FIGS. 1A and 1B, a first surface 101 and a second surface 141 of a substrate, a first conductive member 103, a hole 105, a second conductive member 143, and a third conductive member 163 are illustrated. The substrate is made of an insulator and includes a first surface 101 and a second surface 141. For example, the first surface 101 of the substrate may be the front surface, and the second surface 141 of the substrate may be the rear surface.

The first conductive member 103 is disposed on the first surface 101 of the substrate. The first conductive member 103 may be, but is not limited to, a metal such as copper. The first conductive member 103 may include a first portion 107 and a second portion 111.

The hole 105 is formed in the first portion 107. In the disclosure, the hole 105 is illustrated as a tetragonal shape, but the hole 105 is not limited thereto. The hole 105 may be a circular or polygonal hole. The first portion 107 may operate as a first antenna with the second conductive member 143 located on the second surface 141. The first antenna may be a harvesting antenna for securing energy possessed by electromagnetic waves in a wide frequency band (0.62 GHz to 3.0 GHz), for example, a wideband antenna.

The second portion 111 may operate as a second antenna with a third conductive member 163. The second antenna may be a wireless power reception antenna that provides power to the electronic device. That is, the second antenna may serve to receive wireless power having a frequency of a specific band (e.g., 5.8 GHz) transmitted from an external power transmission device (not illustrated) and to supply the received wireless power to the electronic device. The second antenna may be composed of a plurality of Mu-Zero Resonance (MZR) elements and may have a meta structure. In the following description, the second antenna will be referred to as a meta-structure antenna. For example, the second antenna may include four meta-structure antennas 113, 115, 117, and 119. For example, the second antenna may include a 2×2 array of meta-structure antennas.

A first power feeding portion 110 may be disposed between the first antenna and the second antenna. The first feeding portion 110 may be a via hole, which may be electrically connected to, for example, the second surface of the substrate. The first power feeding portion 110 may be connected to a power circuit of the electronic device.

A signal received by the first antenna through the first power feeding portion 110 and power received by the second antenna may be supplied to the electronic device.

A band-stop filter 109 may be provided between the first antenna and the first power feeding portion 110 in order to block transmission of the signal of a specific frequency band and the energy received by the second antenna. That is, the band-stop filter 109 is located between the first antenna and the first power feeding portion 110, and thus it is possible to prevent degradation in input impedance matching characteristic and performance by preventing a signal of a specific frequency band received by the second antenna from being transmitted to the first antenna.

A band-pass filter 121 may be disposed between the second antenna and the first power feeding portion 110 in order to transmit a signal of a specific frequency band and energy received by the second antenna to the power feeding portion 110.

The second surface 141 of the substrate may include a first area 161 and a second area 147. A second conductive member 143 may be disposed in the first area 161. The second conductive member 143 may be disposed at a position corresponding to a hole 105 formed in the first portion 107 of the first conductive member in order to enhance electromagnetic wave reception efficiency in a wide frequency band (a wide band).

A third conductive member 163 may be disposed in the second area 147. The third conductive member may be connected to a ground of the electronic device. The third conductive member may include a plurality of via holes 149, 151, 153, and 155. The plurality of via holes 149, 151, 153, and 155 correspond to the meta-structure antennas 113, 115, 117, and 119, and the meta-structure antennas may be grounded. In addition, the third conductive member may include a via hole 145, and the via hole 145 may be electrically connected to the first power feeding portion 110 of FIG. 1A.

Figure 2A:
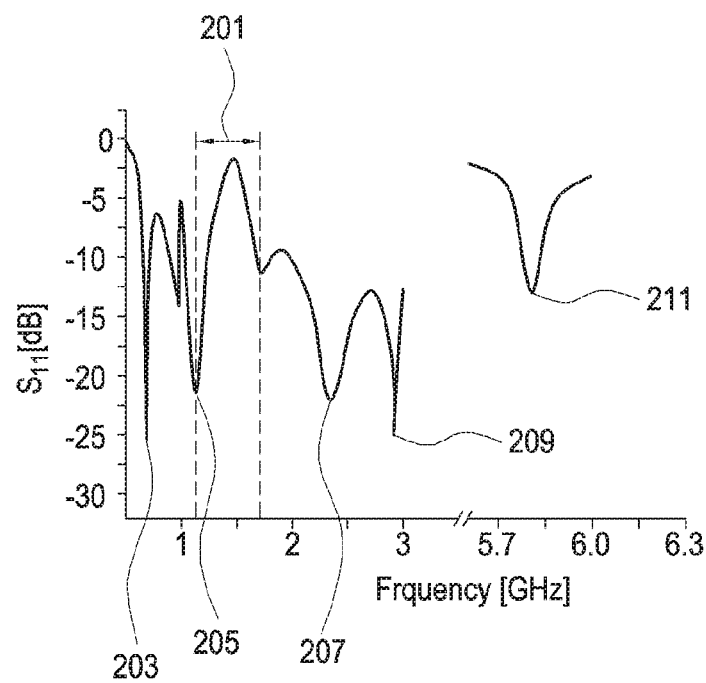
FIGS. 2A and 2B illustrate input impedance matching characteristics of the hybrid antenna according to the embodiment of the disclosure.
Figure 2B:
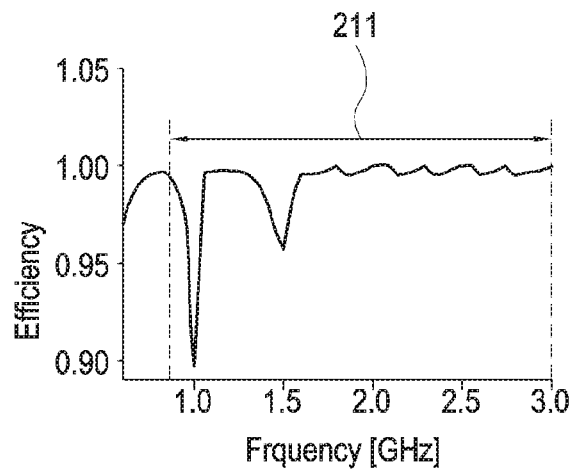

FIGS. 2A and 2B illustrate input impedance matching characteristics of the hybrid antenna according to the embodiment of the disclosure.

Referring to FIGS. 2A and 2B, a plurality of resonance points 203, 205, 207, 209, and 211 are shown. As illustrated in FIG. 2A, it is shown that a hybrid antenna is resonated at a radio power reception frequency of 5.8 GHz (211). That is, it can be seen that there is a resonance point at 5.8 GHz, which is the frequency of wireless power received by the second antenna constituting the hybrid antenna.

In addition, as illustrated in FIG. 2A, in the wideband antenna operation section of 0.62 GHz to 3 GHz, the hybrid antenna shows an input impedance matching characteristic of −6 dB or less, except for a range (201) of 1.31 GHz to 1.61 GHz.

In addition, as illustrated in FIG. 2B, the hybrid antenna exhibits a radiation efficiency of 90% or more in most of the frequency band (211), and has both high efficiency and wide band characteristics, which are major performance factors for energy harvesting. The radiation efficiency may be expressed as a ratio of radiant energy to total energy. Higher radiant energy is favorable for energy transmission, and the radiation efficiency cannot exceed 100%.

Figure 3:
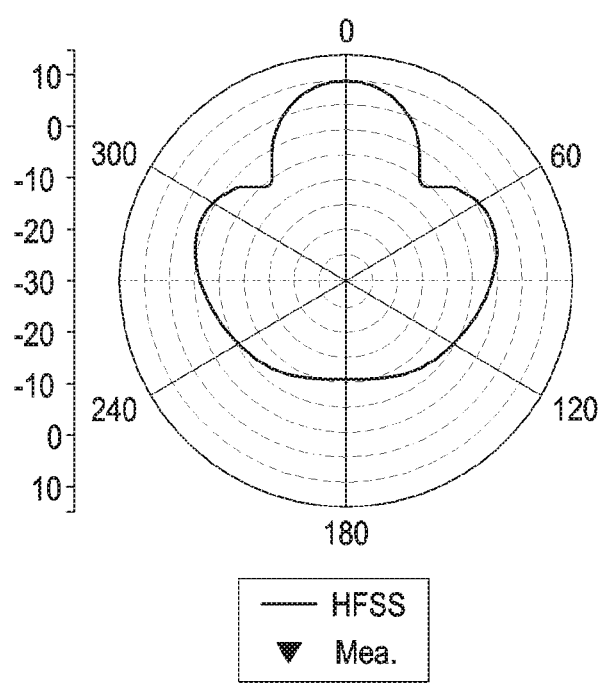
FIG. 3 illustrates a radiation pattern at 5.8 GHz of the hybrid antenna of the disclosure.

FIG. 3 illustrates a radiation pattern at 5.8 GHz of the hybrid antenna of the disclosure.

Referring to FIG. 3, a radiation pattern at a radio power reception frequency of 5.8 GHz of a hybrid antenna is shown. The hybrid antenna exhibits the highest efficiency in the 0-degree direction.

The radiation pattern is a measure indicating how the energy efficiency changes depending on the arrangement angle of the antenna. In the active wireless power transmission, in order to efficiently transmit energy, it is necessary that the direction in which wireless power is transmitted in a wireless power transmission apparatus and the direction in which wireless power is received in the wireless power reception device, that is, the electronic device including a wireless power reception antenna match each other.

Figure 4A:
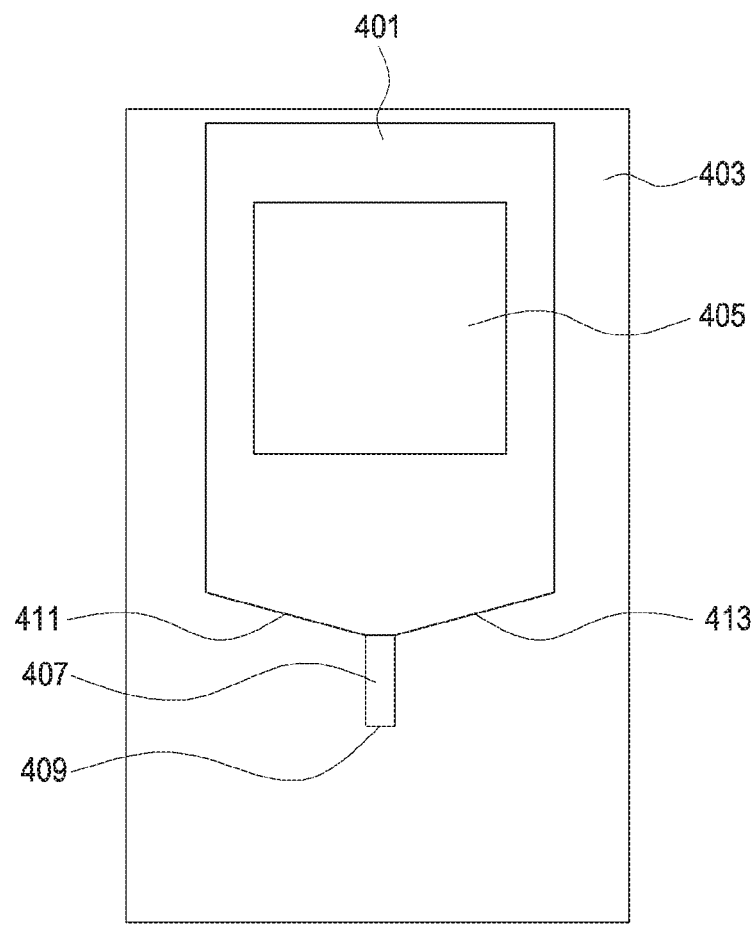
FIGS. 4A and 4B illustrate a first antenna portion of the hybrid antenna according to the embodiment of the disclosure.
Figure 4B:
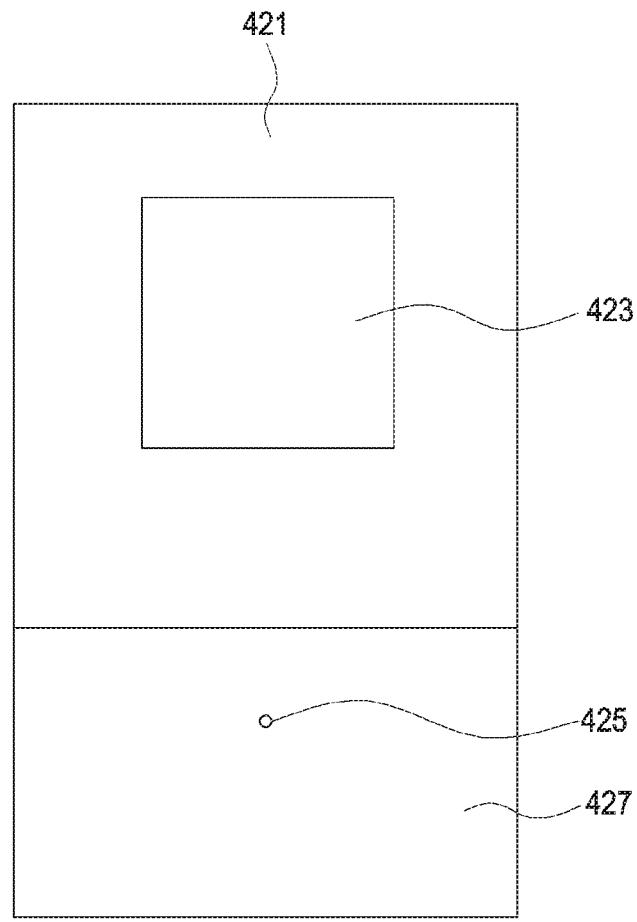

FIGS. 4A and 4B illustrate a first antenna portion of the hybrid antenna according to the embodiment of the disclosure. The first antenna may be, for example, a wideband antenna, and may secure energy by receiving electromagnetic waves in a wide frequency band.

Referring to FIGS. 4A and 4B, a first surface 403 of the substrate, a first conductive member 401, a tetragonal hole 405, a second surface 421 of the substrate, a second conductive member 423, and a third conductive member 427 are illustrated. The substrate is made of an insulator and includes a front surface 403 and a rear surface 421.

The first conductive member 401 is disposed on the first surface 403 of the substrate. The tetragonal hole 405 is formed in the first conductive member 401. In this embodiment, the hole is shown as a tetragonal shape but may have a circular or other polygonal shape. The lower ends 411 and 413 of the first conductive member 401 may have a tapered line, that is, an inclined line structure. A feed line 407 and a first power feeding portion 409 may be formed in the central portion of the lower ends 411 and 413 of the first conductive member 401.

The second conductive member 423 and the third conductive member 427 are disposed on the second surface 421 of the substrate. The second conductive member 423 may be disposed at a position corresponding to the tetragonal hole 405.

The first conductive member 401, the tetragonal hole 405, the tapered structures 411 and 413, and the second conductive member 423 may operate as a wideband antenna for receiving a wideband frequency signal.

The broadband antenna may include the tapered structures 411 and 413 in the monopole antenna and the tetragonal hole 405 inside the first conductive member 411 to broaden the bandwidth. The second conductive member 423 may be, for example, a copper plate, and the wideband antenna may additionally generate two resonance frequencies using the copper plate. The wideband antenna may include a total of four resonance frequencies to enable wideband impedance matching.

The first power feeding portion 409 may be connected to the third conductive member 427 through a via hole 425. The third conductive member 427 may be connected to a ground of the electronic device. The first power feeding portion 409 may be connected to a power circuit of the electronic device. Thus, a signal received by the wideband antenna may be transmitted to the power circuit of the electronic device through the first power feeding portion.

Figure 5:
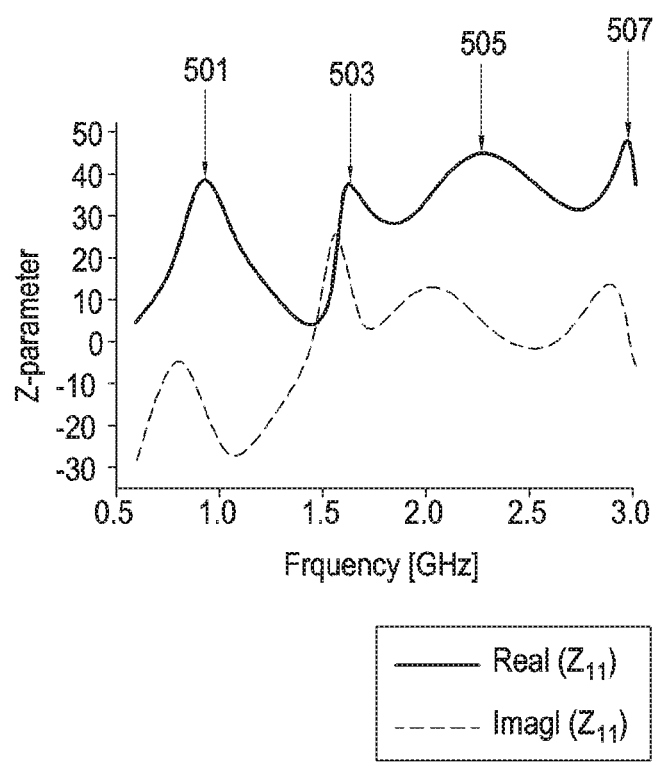
FIG. 5 illustrates frequency characteristics of the first antenna portion of the hybrid antenna according to the embodiment of the disclosure.

FIG. 5 illustrates frequency characteristics of the first antenna portion of the hybrid antenna according to the embodiment of the disclosure. Referring to FIG. 5, the hybrid antenna may be resonated at a first resonance point 501, a second resonance point 503, a third resonance point 505, and a fourth resonance point 507. The frequencies corresponding to the first resonance point 501 and the third resonance point 503 correspond to a ¼ wavelength and a ¾ wavelength of a tapered monopole antenna (hereinafter, referred to as a "monopole antenna"), respectively. The frequencies corresponding to the second resonance point 503 and the fourth resonance point 507 correspond to a 1 wavelength and a 2 wavelength generated by the tetragonal hole 405 and the second conductive member 423 inside the monopole antenna, respectively. Since the resonance frequencies generated by the monopole antenna and the resonance frequencies generated by the second conductive member 423 are alternately arranged, it is possible to perform impedance matching in a wide band.

Figure 6:
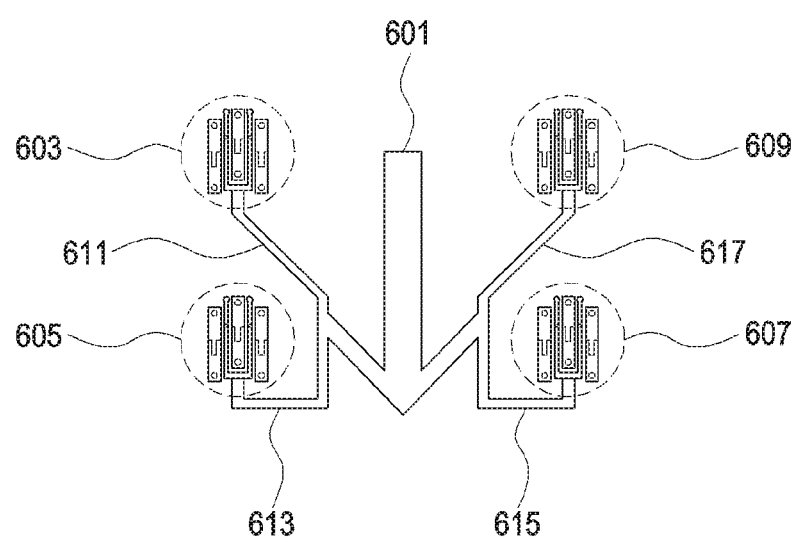
FIG. 6 illustrates a second antenna portion of the hybrid antenna according to the embodiment of the disclosure.

FIG. 6 illustrates a second antenna portion of the hybrid antenna according to the embodiment of the disclosure. The second antenna may be, for example, a wireless power reception antenna that provides power to the electronic device. The second antenna may include a plurality of meta-structure antennas 603, 605, 607, and 609. Each of the meta-structure antennas 603, 605, 607, and 609 may be implemented using an MZR element. Each of the meta-structure antennas 603, 605, 607, and 609 may include a transmission line 611, 613, 615, or 617 for transmitting the received power to a first power feeding portion 601.

For example, the first meta-structure antenna 603 includes a first transmission line 611, and the power received by the first meta-structure antenna 603 may be transmitted to the first power feeding portion 601 through the first transmission line 611.

The second meta-structure antenna 605 includes a second transmission line 613, and the power received by the second meta-structure antenna 605 may be transmitted to the first power feeding portion 601 through the second transmission line 613.

The third meta-structure antenna 607 includes a third transmission line 615, and the power received by the third meta-structure antenna 607 may be transmitted to the first power feeding portion 601 through the third transmission line 615.

The fourth meta-structure antenna 609 includes a fourth transmission line 617, and the power received by the fourth meta-structure antenna 609 may be transmitted to the first power feeding portion 601 through the fourth transmission line 617.

The lengths of the first transmission line 611, the second transmission line 613, the third transmission line 615, and the fourth transmission line 617 may all be the same. Since the lengths are the same, at 0 degrees of the radiation pattern, that is, when the electronic device including the second antenna faces the wireless power transmission device from the front, the gains of the respective antennas can be combined to obtain high efficiency. That is, the length of the transmission line from the first power feeding portion 601 to the first meta antenna 603, the length of the transmission line from the first power feeding portion 601 to the second meta antenna 605, the length of the transmission line from the first power feeding portion 601 to the third meta antenna 607, and the length of the transmission line from the first power feeding portion 601 to the fourth meta antenna 609 may all be the same.

Figure 7:
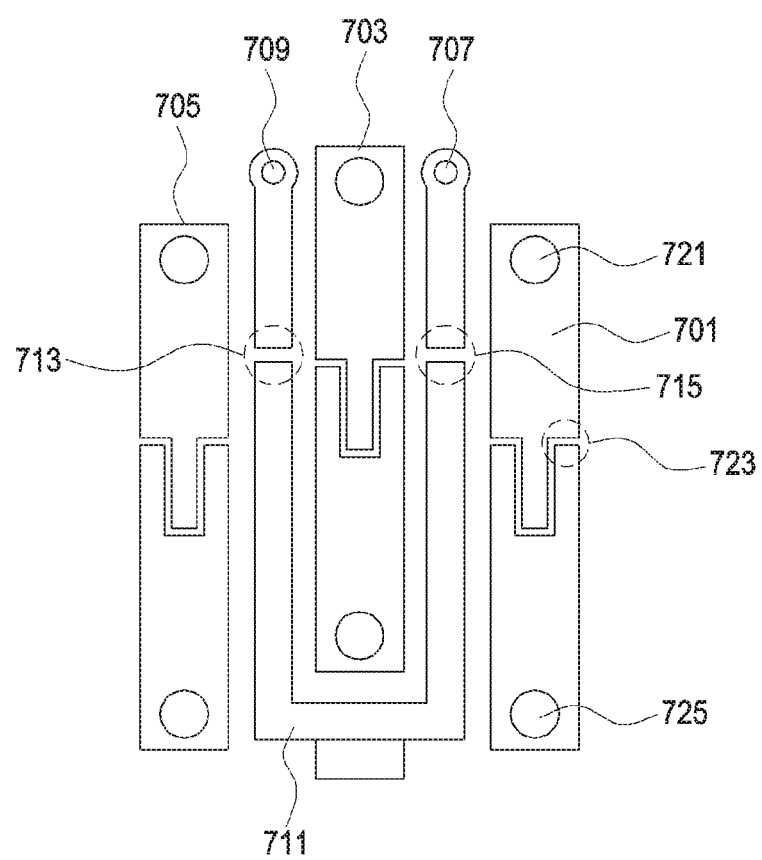
FIG. 7 illustrates a meta-structure antenna according to the embodiment of the disclosure in an enlarged scale.

FIG. 7 illustrates a meta-structure antenna according to the embodiment of the disclosure in an enlarged scale. The view of the meta-structure antenna of FIG. 7 is an enlarged view of the first meta-structure antenna 603 among the plurality of meta-structure antennas of FIG. 6. Referring to FIG. 7, the meta-structure antenna may include radiators 701, 703, and 705 and a transmission line 711 for power feeding. The transmission line 711 may be implemented using a microstrip line. In the following description, the power feeding by the transmission line 711 implemented using a microstrip line will be described as an example, but power feeding may be performed using a coaxial line instead of the microstrip line.

The radiators 701, 703, and 705 may be implemented using MZR elements. The central portion of each of the radiators 701, 703, and 705 may include an interdigital structure gap 723, which may operate as a capacitor. Via holes 721 and 725 may be formed in the opposite end portions of the radiator 701. The via holes 721 and 725 may be connected to the third conductive member 163 of FIG. 1B to have a ground potential. When the positions of the via holes 721 and 725 are changed, the input impedance may be changed.

A transmission line 711 for power feeding is disposed between the radiators 701, 703, and 705 and the power received from the radiators 701, 703, and 705 is indirectly fed so as to be transmitted to the first power feeding portion 110 (the first power feeding portion 110 in FIG. 1A). The input impedance may be changed when the gaps between the radiators 701, 703, and 705 and the transmission line 711 are changed.

Meanwhile, gaps 713 and 715 are disposed on one side of the transmission line 711 and may be connected to the third conductive member 163 of FIG. 1B through the via holes 707 and 709, thereby being grounded.

Figure 8:
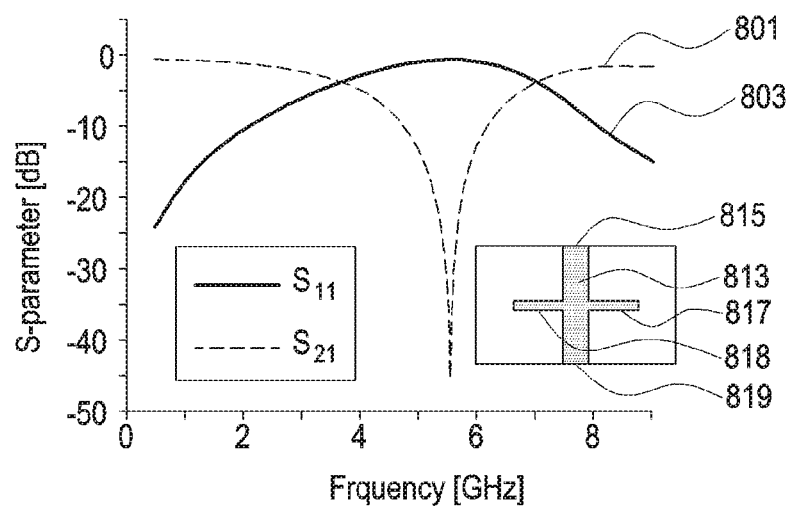
FIG. 8 illustrates a band-stop filter portion and frequency characteristics of the hybrid antenna according to the embodiment of the disclosure.

FIG. 8 illustrates a band-stop filter portion and frequency characteristics of the hybrid antenna according to the embodiment of the disclosure.

Referring to FIG. 8, a band-stop filter 813 blocks a signal in the vicinity of 5.8 GHz, which is the wireless power reception frequency, thereby blocking the power received from the meta-structure antenna from being transmitted to the wideband antenna. The reflection coefficient 803 of the band-pass filter 813 may be −0.1 dB at 5.8 GHz and the transmission coefficient 801 may be −40 dB or less.

The band-stop filter 813 may be disposed between the first antenna and the first power feeding portion as illustrated in FIG. 1A. That is, a first side 815 of the band-stop filter 813 may be coupled to the first antenna, and a second side 819 may be coupled to the first power feeding portion.

The band-stop filter 813 includes two open stubs 817 and 818, which may be arranged in a symmetrical form.

Figure 9:
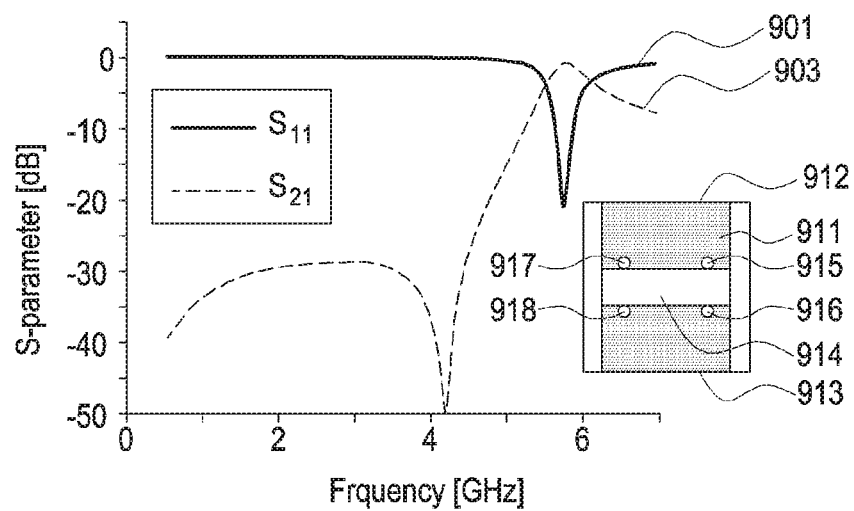
FIG. 9 illustrates a band-pass filter portion and frequency characteristics of the hybrid antenna according to the embodiment of the disclosure.

FIG. 9 illustrates a band-pass filter portion and frequency characteristics of the hybrid antenna according to the embodiment of the disclosure.

Referring to FIG. 9, a band-pass filter 911 passes a signal of 5.8 GHz band, which is a wireless power reception frequency, so that the power received from the meta-structure antenna can be transmitted to a first power feeding portion.

The reflection coefficient 901 of the band-pass filter 911 may be −0.99 dB at 5.8 GHz, and the transmission coefficient 903 may be −19 dB.

The band-pass filter 911 may be disposed between the second antenna and the first power feeding portion as illustrated in FIG. 1A. That is, a first side 912 of the band-pass filter 911 may be coupled to the first power feeding portion, and a second side 913 may be coupled to the second antenna.

The band-pass filter 911 may include a lumped element capacitor 914 and four via holes 915, 916, 917, and 918. The diameter of the via holes 915, 916, 917, and 918 may be approximately 0.2 mm, and the value of the capacitor may be 0.9 pF. The setting of a passband frequency may be determined by the diameter of the via holes 915, 916, 917, and 918, the number of via holes 915, 916, 917, and 918, and the value of the capacitor 914. In addition, the band-pass characteristics may be optimized through the arrangement form of the through-holes 915, 916, 917, and 918.

What is claimed is:

1. An antenna of an electronic device, the antenna comprising:
   a substrate comprising an insulator;
   a first conductive member disposed on a first surface of the substrate and including a hole formed therein; and
   a second conductive member disposed on a first area of a second surface of the substrate,
   wherein a first portion of the first conductive member is configured to operate as a first antenna for receiving a radio frequency, RF, signal and supplying first power based on the RF signal to the electronic device, a second portion of the first conductive member is configured to operate as a second antenna for wirelessly receiving second power and supplying the second power to the electronic device, a first power feeding portion is disposed between the first antenna and the second antenna, and the second portion includes a plurality of meta-structure antennas comprising a plurality of MZR (Mu-Zero Resonance) elements.

2. The antenna of claim 1, wherein a band-stop filter is disposed between the first power feeding portion and the first antenna.

3. The antenna of claim 1, wherein a band-pass filter is disposed between the first power feeding portion and the second antenna.

4. The antenna of claim 1, wherein each of the plurality of meta-structure antennas includes an interdigital structure gap.

5. The antenna of claim 1, further comprising:
   a third conductive member disposed in a second area of the second surface of the substrate,
   wherein one side of each of the plurality of MZR (Mu-Zero Resonance) elements is connected to the third conductive member through a via hole.

6. The antenna of claim 1, wherein each of the plurality of meta-structure antennas is fed with power through a microstrip line.

7. The antenna of claim 1, wherein lengths of transmission lines from respective meta-structure antennas to the first power feeding portion are all same.

8. The antenna of claim 1, wherein transmission lines are disposed between the plurality of MZR (Mu-Zero Resonance) elements that comprise the plurality of meta-structure antennas.

9. The antenna of claim 1, wherein the second conductive member is disposed at a position corresponding to the hole.

10. The antenna of claim 1, wherein one side of the first portion of the first conductive member has a tapered line structure.

11. The antenna of claim 1, wherein the first portion of the first conductive member, the hole, the substrate, and the second conductive member form a resonance circuit.

12. The antenna of claim 2, wherein the band-stop filter has an open stub structure.

13. The antenna of claim 3, wherein a capacitance of the band-pass filter is determined by an interdigital gap.

14. The antenna of claim 3, wherein a capacitance of the band-pass filter is determined by a capacitor disposed in a band-stop filter.

* * * * *